Patented May 5, 1936

2,039,512

UNITED STATES PATENT OFFICE 2,039,512

DEHYDRATING COMPOSITIONS

Howard H. Baker, Buffalo, N. Y.

No Drawing. Application August 12, 1933,
Serial No. 684,927

7 Claims. (Cl. 252—2.5)

My invention relates to improvements in dehydrating compositions adapted for use in various places and for various purposes, and especially to those forms of dehydrating compositions or substances designed to absorb moisture from surrounding objects or parts, and to maintain the air within a room or any other compartment in a dry condition.

Most dehydrating substances, especially such as are in solid form, become gradually dissipated or dissolved under the action of air, with the result that the entire body becomes worn away and, moreover, the hygroscopic or moisture-attracting effects are such that the composition or substance will have spent itself over a short period of time, necessitating replacement at short intervals, which is expensive and has been found a deterrent to the use of such substances in vaults, printing establishments, paper warehouses, and many other places where dry air is highly desirable.

The primary object of my invention is the production of a cheap and highly efficient dehydrating composition or substance which has a slow acting hygroscopic or moisture attracting effect so that the hygroscopic medium will be active over a long period of time, making it possible to use the same at reasonable cost in cellars, vaults, warehouses, poultry houses, stock rooms, and many other places; also in show cases used for displaying confections, adjacent to store windows for keeping the surface free of moisture, and for many other purposes and in innumerable other places.

Another object of my invention is the provision of a dehydrating composition or substance which can be molded in solid form and which possesses the qualities of attracting moisture from the air and from adjacent objects under moderate action, to the end that the composition or substance will have long life and be effective until the active hygroscopic elements, ingredients, or part or parts thereof are fully consumed.

Another object of my invention is the provision of a dehydrating composition or substance in solid form, comprising hygroscopic elements, particles or portions and a form-retaining element, substance, or portion in which the hygroscopic elements, preferably in granular or particle form are retained with the granules or particles substantially in contact with each other, or at least in such relation that they are under the action of air, exposed to the air successively inwardly from the surface of the composition or substance.

A still further object of my invention is the provision of a dehydrating composition including a form-retaining substance, hygroscopic particles dissoluble under moisture in the air, and a highly volatile substance which evaporates rapidly so as to expose the hygroscopic particles while retaining the original form of the composition.

A still further object of my invention is the provision of a dehydrating composition, consisting of a hygroscopic salt of an inorganic nature and a form-retaining substance, such as wax, in which the hygroscopic salt is distributed in particles, the particles being in such relation that they are distributed throughout the body and surface-exposed; so that as these exposed particles are brought into action and consumed, particles directly behind or within the structure are subjected to the action of the air and similarly consumed, with the result that eventually the structure will have a porous appearance, the pores of which extend from the exterior of the structure inwardly to the innermost regions thereof.

My invention still further consists in the production of a dehydrating composition, consisting of a hygroscopic salt, such as calcium chloride, or any other hygroscopic material, paradichlorobenzene, sodium chloride, charcoal, and wax, preferably paraffin wax, the whole being thoroughly mixed and molded or cast to desired solid form.

While most effective results are assured by the use of a composition including the several substances last-mentioned, some of these can be dispensed with and fairly effective results obtained.

My invention therefore further has for its object the molding of calcium chloride or other hygroscopic agent in granular form, into desired shape when mixed with another, or other ingredients, exemplifications of which will be more particularly set out hereinafter.

My invention consists in a dehydrating composition or substance, comprising a hygroscopic agent or ingredient and a form-retaining wax or other substance in which the hygroscopic agent or ingredient, preferably in granular form, is intimately mixed, and preferably molded or cast into solid form.

The invention further consists in the mixture of the substances or ingredients last-mentioned, in combination with other ingredients, to be hereinafter more particularly pointed out.

The composition essentially consists of calcium chloride or any other hygroscopic salt or substance; for example, sodium chloride, and a form-retaining material; for example, paraffine wax or a substance possessing like qualities in which the calcium chloride, preferably in granular form, is intimately mixed. The wax or other form-retaining material is melted so as to assume a liquid or semi-liquid form and thus permit it to be poured over the calcium chloride, and while the wax is still in liquid form the two substances are intimately mixed so that the particles of calcium chloride are evenly distributed throughout the wax, and as it may be termed, held in suspension, the main purpose of the wax being to provide the desired form for the hygroscopic unit, since the mixing is effected in molds having the form to which the completed unit is to be patterned.

The wax is naturally water-resisting and employed for the purpose of holding the hygroscopic particles of calcium chloride or other material in suspension with each particle in contact with another, or other particles, and as these particles are exposed on the surface of the molded product and are interspersed throughout the molded structure they have a tendency to dissolve under action of the air, leaving pockets, pores, or veins all through the wax structure, thus creating an effect simulating a honey comb. In this manner, air cells are created in the wax portion of the structure and as such portion is impervious to moisture, the moisture absorbed by the hygroscopic particles pass freely over the walls of the pores and escapes from the latter. Through the medium of the air cells so formed the hydroscopic particles are exposed to the air regardless of their location within the molded structure, since these pores will open up more remote hygroscopic particles and expose them to the air so that the particles become active successively from the exterior of the molded structure to the innermost region thereof, thus forming a porous or spongy mass of wax. The pores or veins thus created assure activity to the innermost regions of the structure.

Under such an arrangement the life of a hygroscopic medium is prolonged, yet the hygroscopic action of the structure is such that ordinary moisture within a confined space will be fully absorbed. While tolerably effective action results from such a product, I preferably combine the calcium chloride and wax with paradichlorobenzene, sodium chloride, and charcoal or other wood dust, or any of these, each such ingredient having a particular purpose and effect in action, and the entire combination mentioned being the form in which my invention is most effective. Where, any or all of these three last-mentioned ingredients are combined with the calcium chloride, such ingredients and the calcium chloride are thoroughly mixed together in dry form, and when so mixed, the melted wax is poured over this dry mixture.

Calcium chloride is the hygroscopic substance or ingredient, or at least the main hygroscopic substance or ingredient, maintained in a form in which it is slow in action yet highly effective in absorptive qualities. The paradichlorobenzene, when included in the composition, provides the advantage of a powerful insecticide, and is highly volatile. Moreover, it evaporates rapidly under contact with air so that it constantly opens new pores in the molded body for activity of the calcium chloride. This particular ingredient has a low melting point, and it serves as a moth repellant and germicide, as well as a most effective disinfectant. Napthalene, for example, may be substituted, but as some of the advantages of paradichlorobenzene are not inherent in napthalene, the former is preferably used.

When sodium chloride is employed as an ingredient, the composition has certain advantages in that this ingredient serves to break down the water-proofing of the wax as well as stimulate the action of the other ingredients. When employing charcoal I preferably employ charcoal formed of peach pits, since it has a tendency to dissolve poisonous gases, but the charcoal may be from various woods, or charcoal from nuts may be used. The charcoal may be scented to act as a deodorant, fumigator, as well as an air purifier. Charcoal has the tendency to absorb moisture and purify air regardless of whether or not it is scented, and it is preferably employed in such cases where my invention is used in bank and safe deposit vaults, stock and store rooms, building equipment, and as a general protection to merchandise.

From the foregoing, it will be apparent that the use of the several ingredients named herein results in a dehydrating composition or substance having advantages over a composition in which less than all of the aforementioned ingredients are used, but for some purposes a composition will be fully as serviceable having as ingredients less than all of those mentioned.

The wax, which is the form-retaining substance, or any other form-retaining substance or material it may be decided to employ, is used in saturating quantities, enough only being used to displace the sections or fill the interstices between the granules or particles of calcium chloride so as to solidly fill the mold to the form to which the substance is intended to be molded. There are consequently so many granules or particles used that only a very slight film of wax exists between them, and more particularly between portions of adjoining granules or particles, after molding the substance to form. When the granules or particles exposed to the air become consumed, the wax film becomes broken down or disintegrated under the chemical reaction of the combination of the chemicals used, and all adjacent granules or particles become exposed to the air. This breaking down or disintegrating action is augmented by the use of paradichlorobenzene or a similar agent. It is also to be understood that any hygroscopic salt or sulphate may be used in lieu of calcium chloride.

The use of paradichlorobenzene has the particular advantage of quickly evaporating under exposure to the air, thus leaving pockets in the wax structure where deposits of this substance were created during the molding of the structure, thus exposing granules or particles of the hygroscopic or main hygroscopic ingredient under quicker action than would occur if the paradichlorobenzene were not used.

Borax, sal soda, carbonate of soda, or most any of the sodium salts could be used instead of sodium chloride, but sodium chloride possesses advantages as a dehydrating substance which other sodiums do not possess to the same degree.

If desired, sawdust could be used in lieu of charcoal; either possessing the qualities of drying the air and of purifying the same. Charcoal, however, has been found to be more effective for such purposes.

It will be apparent from the foregoing that calcium chloride and wax may be used with practically the same result, but under slower action. Any substance having hygroscopic qualities may be substituted for the calcium chloride and be combined with the wax. For example, sodium chloride used as a secondary ingredient in my preferred composition would serve as a hygroscopic agent, but to nowhere near as efficient a degree as calcium chloride and wax.

Paradichlorobenzene and wax could function as a dehydrating substance, and would be highly effective, but only over a comparatively short period of time.

Lime and wax could be used and would be exceedingly cheap, but nowhere near as effective as calcium chloride and wax.

In preferred form my hygroscopic composition comprises approximately 85 percent calcium chloride, 10 percent paradichlorobenzene, 3 percent sodium chloride, charcoal or sawdust 2 percent. These ingredients are in granular or crystal and powdered form and thoroughly mixed together, after which melted wax is poured over the mixture and the whole mass thoroughly stirred or otherwise mixed so that the ingredients become substantially equally distributed throughout the wax. I prefer to mix the wax with the various other ingredients in molds of a form to which the product is to be finished, but if desired the mixture may be molded in large bulk form and cut or otherwise fashioned to the form in which it is to be used.

Although calcium chloride and wax—the latter being a form-establishing and sustaining substance and a binder as well—when combined with sodium chloride and paradichlorobenzene forms a highly effective dehydrating substance or unit. Such ingredients combined with the calcium chloride within wax or a similar substance renders the calcium chloride more active, for reasons hereinbefore mentioned.

I desire it to be understood that under the term "granular" I include ingredients in crystal or other particle form, but the use of a hygroscopic medium in any form, may of course be used if capable of being retained within a form-retaining substance.

Under the term "form-retaining" substance I mean a substance capable of being molded or otherwise formed to the desired shape, and of having molded, or otherwise embodied therein, the hygroscopic substance, so long as it has water-resisting and water-shedding qualities.

By reason of the form-retaining substance being water resistant, moisture attracted thereto by the hygroscopic material therein will not cause the form-retaining substance to become softened or change in form and will shed the water therefrom so that, as water is attracted thereto, it will drip therefrom and accumulate in a can in which the complete device is supported. This applies to any other broad term applied to the body portion of the device.

Under the term "hygroscopic material" as herein used, or any generic term applied to this substance, it is intended to cover hygroscopic material or substance capable of being practically used in a device of this kind.

Having thus described my invention, what I claim is:

1. A dehydrating unit, comprising a body of wax, containing material possessing moisture-absorbing qualities arranged therein so that said material is brought under hygroscopic action from the exterior of said body of wax inwardly.

2. A hygroscopic unit, comprising a wax-like water-resisting body portion having hygroscopic particles mixed therein and distributed throughout the same, said hygroscopic particles serving to attract moisture from the air and under action of the air being successively consumed from the exterior of said wax body to the innermost region thereof, gradually rendering said body porous under gradually enlarged regions from the pores of which water passes outwardly over the walls of said pores.

3. A hygroscopic composition, comprising calcium chloride, paradichlorobenzene, and sodium chloride mixed together in dry form and distributed in wax molded to desired form.

4. A hygroscopic composition, comprising calcium chloride, paradichlorobenzene, sodium chloride, and wood charcoal mixed together in dry form and distributed in wax molded to desired form.

5. A dehydrating substance, comprising calcium chloride and paradichlorobenzene intimately mixed together within a body of suitable wax.

6. A dehydrating substance, comprising calcium chloride, paradichlorobenzene, and sodium chloride mixed together within a suitable body of paraffin wax.

7. A dehydrating substance, comprising calcium chloride, paradichlorobenzene, sodium chloride, and an air purifier in the form of wood dust all combined within a body of paraffin wax.

HOWARD H. BAKER.